US011915851B2

(12) United States Patent
Tsuchiya et al.

(10) Patent No.: US 11,915,851 B2
(45) Date of Patent: Feb. 27, 2024

(54) INDUCTOR AND METHOD FOR PRODUCING THE SAME

(71) Applicant: Murata Manufacturing Co., Ltd., Kyoto-fu (JP)

(72) Inventors: Yuichi Tsuchiya, Nagaokakyo (JP); Takumi Arai, Nagaokakyo (JP); Motoki Toyama, Nagaokakyo (JP); Ryuta Uematsu, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 660 days.

(21) Appl. No.: 17/072,556

(22) Filed: Oct. 16, 2020

(65) Prior Publication Data

US 2021/0118602 A1 Apr. 22, 2021

(30) Foreign Application Priority Data

Oct. 18, 2019 (JP) ................................ 2019-191103

(51) Int. Cl.
*H01F 27/28* (2006.01)
*H01F 1/147* (2006.01)
(Continued)

(52) U.S. Cl.
CPC ....... *H01F 27/255* (2013.01); *H01F 1/14766* (2013.01); *H01F 27/29* (2013.01); *H01F 41/0246* (2013.01); *H01F 41/04* (2013.01)

(58) Field of Classification Search
CPC .... H01F 27/255; H01F 1/14766; H01F 27/29; H01F 41/0246; H01F 41/04; H01F 2017/065; H01F 17/06; H01F 27/292
(Continued)

(56) References Cited

U.S. PATENT DOCUMENTS 6,384,705 B1 * 5/2002 Huang ................ H01F 17/0013 336/200
2010/0253463 A1 * 10/2010 Shimomura .......... H01F 27/292 336/200
(Continued)

FOREIGN PATENT DOCUMENTS

JP 2015-207617 A 11/2015
JP 2018-182210 A 11/2018
(Continued)

OTHER PUBLICATIONS

An Office Action mailed by China National Intellectual Property Administration dated Mar. 3, 2022, which corresponds to Chinese Patent Application No. 202011114691.X and is related to U.S. Appl. No. 17/072,556 with English language translation.
(Continued)

*Primary Examiner* — Bickey Dhakal
*Assistant Examiner* — Kazi S Hossain
(74) *Attorney, Agent, or Firm* — Studebaker & Brackett PC

(57) ABSTRACT

An inductor includes an external terminal and an element body that includes a magnetic portion containing a magnetic powder and a coil embedded in the magnetic portion. The magnetic powder has a particle size D50 at 50% of the cumulative volume of 5 μm or less, a D90/D10 of 19 or lower, and a Vickers hardness of 1000 (kgf/mm$^2$) or lower, the D90/D10 being the ratio of particle size D90 at 90% of the cumulative volume to particle size D10 at 10% of the cumulative volume in the cumulative particle size distribution by volume. In the magnetic portion, the packing density of the magnetic powder by volume is 60% or higher.

19 Claims, 3 Drawing Sheets

(51) Int. Cl.
*H01F 27/255* (2006.01)
*H01F 27/29* (2006.01)
*H01F 41/02* (2006.01)
*H01F 41/04* (2006.01)

(58) Field of Classification Search
USPC ................................. 336/192, 232, 200, 198
See application file for complete search history.

(56) References Cited

U.S. PATENT DOCUMENTS

| | | | | |
|---|---|---|---|---|
| 2012/0001710 | A1* | 1/2012 | Wakabayashi | C22C 38/02<br>335/297 |
| 2018/0308631 | A1* | 10/2018 | Shinohara | H01F 27/2823 |

FOREIGN PATENT DOCUMENTS

| | | | | |
|---|---|---|---|---|
| JP | 2019-117898 | A | 7/2019 | |
| JP | 2019-153644 | A | 9/2019 | |
| WO | 2009075110 | A1 | 6/2009 | |
| WO | 2018/221015 | A1 | 12/2018 | |
| WO | WO-2018221015 | A1 * | 12/2018 | H01F 17/04 |

OTHER PUBLICATIONS

An Office Action; "Notice of Reasons for Refusal," mailed by the Japanese Patent Office dated Apr. 19, 2022, which corresponds to Japanese Patent Application No. 2019-191103 and is related to U.S. Appl. No. 17/072,556 with English language translation.

* cited by examiner

INDUCTOR AND METHOD FOR PRODUCING THE SAME

CROSS-REFERENCE TO RELATED APPLICATION

This application claims benefit of priority to Japanese Patent Application No. 2019-191103, filed Oct. 18, 2019, the entire content of which is incorporated herein by reference.

BACKGROUND

Technical Field

The present disclosure relates to an inductor and a method for producing the same.

Background Art

Related inductors are obtained by covering, with a magnetic portion obtained by pressure molding a mixture of magnetic metal powder and a binding material, a coil conductor formed of a metal conductor. The terminals of such inductors are formed by bending the metal conductors, as described, for example, in International Publication No. 2009/075110. Such inductors are used for various electronic devices. In recent years, circuits, such as DC-DC converter circuits, in various electronic devices have had higher operating frequencies, and current applied to such circuits has been increased.

SUMMARY

Related inductors cannot always sufficiently cope with higher frequency and higher current and may thus decrease the circuit characteristics of circuits using such inductors, such as DC-DC converter circuits. An aspect of the present disclosure is to provide an inductor having excellent high-frequency characteristics.

An inductor according to a first aspect includes an external terminal and an element body that includes a magnetic portion containing a magnetic powder and a coil embedded in the magnetic portion. The magnetic powder has a particle size D50 at 50% of the cumulative volume of 5 μm or less, a D90/D10 of 19 or lower, and a Vickers hardness of 1000 (kgf/$mm^2$) or lower, the D90/D10 being the ratio of particle size D90 at 90% of the cumulative volume to particle size D10 at 10% of the cumulative volume in the cumulative particle size distribution by volume. In the magnetic portion, the packing density of the magnetic powder by volume is 60% or higher.

A method according to a second aspect for producing an inductor includes embedding a coil in a magnetic material that contains a magnetic powder and 5 mass % or lower of a resin, the magnetic powder having a particle size D50 at 50% of the cumulative volume of 5 μm or less, a D90/D10 of 19 or lower, and a Vickers hardness of 1000 (kgf/$mm^2$) or lower, the D90/D10 being the ratio of particle size D90 at 90% of the cumulative volume to particle size D10 at 10% of the cumulative volume in the cumulative particle size distribution by volume, and molding, with a pressure of 5 ton/$cm^2$ or more, the magnetic material in which the coil is embedded, to obtain an element body in which the packing density of the magnetic powder is 60% or higher.

According to an aspect of the present disclosure, an inductor having excellent high-frequency characteristics is provided.

Other features, elements, characteristics and advantages of the present disclosure will become more apparent from the following detailed description of preferred embodiments of the present disclosure with reference to the attached drawings.

DETAILED DESCRIPTION

Figure 1:
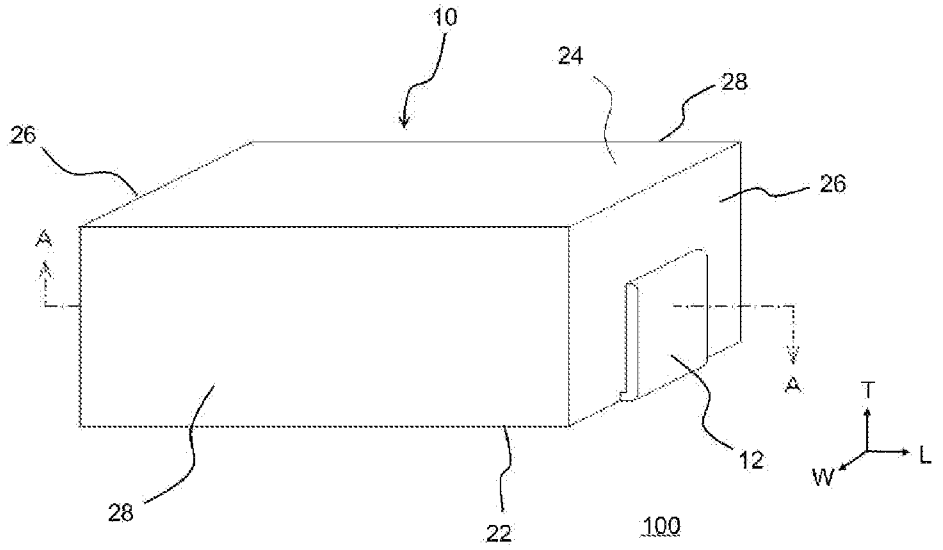
FIG. 1 is a perspective view of an exemplary inductor.

An inductor according to the present embodiment includes an external terminal and an element body that includes a magnetic portion containing a magnetic powder and a coil embedded in the magnetic portion. The magnetic powder has a particle size D50 at 50% of the cumulative volume of 5 μm or less, a D90/D10 of 19 or lower, and a Vickers hardness of 1000 (kgf/$mm^2$) or lower, the D90/D10 being the ratio of particle size D90 at 90% of the cumulative volume to particle size D10 at 10% of the cumulative volume in the cumulative particle size distribution by volume. In the magnetic portion, the packing density of the magnetic powder by volume is 60% or higher.

Regarding an inductor that has a small average particle size, a narrow particle size distribution, and a magnetic portion containing a magnetic powder having a hardness lower than or equal to the predetermined value, a decrease in the inductance is suppressed and the inductor has excellent Q factor in a high-frequency region. In such an inductor, an increase in the resistance in a high-frequency region is suppressed. Thus, the inductor can sufficiently cope with higher current.

The element body has a substantially cuboid shape and has two main surfaces opposing each other, end surfaces opposing each other, the end surfaces being next to the respective main surfaces, and side surfaces opposing each other, the side surfaces being next to the respective main and end surfaces. One of the two main surfaces is a mounting surface and the other is the top surface. The element body is defined by the height T, which is the dimension between the mounting surface and the top surface, the length L, which is the dimension between the end surfaces, and the width W, which is the dimension between the side surfaces. The element body has a length L of, for example, 0.5 mm or more and 3.4 mm or less (i.e., from 0.5 mm to 3.4 mm) and preferably 1 mm or more and 3 mm or less (i.e., from 1 mm to 3 mm), a width W of, for example, 0.5 mm or more and 2.7 mm or less (i.e., from 0.5 mm to 2.7 mm) and preferably 0.5 mm or more and 2.5 mm or less (i.e., from 0.5 mm to 2.5 mm), and a height T of, for example, 0.5 mm or more and 2 mm or less (i.e., from 0.5 mm to 2 mm) and preferably 0.5 mm or more and 1.5 mm or less (i.e., from 0.5 mm to 1.5 mm). Specifically, the size of the element body, L×W×T, may be 1 mm×0.5 mm×0.5 mm, 1.6 mm×0.8 mm×0.65 mm, 2 mm×1.2 mm×0.8 mm, or 2.5 mm×2 mm×1.0 mm.

The coil is formed of a straight metal sheet. In a coil formed of a straight metal sheet, generation of distributed capacitance is suppressed. Thus, the coil can sufficiently cope with higher current. The metal sheet forming the coil contains a conductive metal material, such as copper. The metal sheet forming the coil has a thickness of, for example, 0.05 mm or more and 0.2 mm or less (i.e., from 0.05 mm to 0.2 mm) and preferably 0.1 mm or more and 0.15 mm or less (i.e., from 0.1 mm to 0.15 mm) and a width of, for example, 0.3 mm or more and 1.0 mm or less (i.e., from 0.3 mm to 1.0 mm) and preferably 0.45 mm or more and 0.75 mm or less (i.e., from 0.45 mm to 0.75 mm). The width is in a direction perpendicular to the length direction and the thickness direction.

In the cumulative particle size distribution by volume of the magnetic powder, particle size D10 at 10% of the cumulative volume corresponds to the particle size at which the cumulative volume from the smallest particle size is 10%, particle size D50 at 50% of the cumulative volume corresponds to the particle size at which the cumulative volume from the smallest particle size is 50%, and particle size D90 at 90% of the cumulative volume corresponds to the particle size at which the cumulative volume from the smallest particle size is 90%. Particle size D50 at 50% of the cumulative volume may be 5 μm or less and is preferably 4 μm or less, more preferably 3.6 μm or less, and still more preferably 3 μm or less. Within the above range, particle size D50 at 50% of the cumulative volume may be 1 μm or more and is preferably 2 μm or more. When particle size D50 at 50% of the cumulative volume is 1 μm or more and 5 μm or less (i.e., from 1 μm to 5 μm), the desired inductance can be readily achieved. When particle size D50 at 50% of the cumulative volume is 1 μm or more and 5 μm or less (i.e., from 1 μm to 5 μm), insulation resistance tends to further improve, and withstand voltage tends to further improve. The cumulative particle size distribution of the magnetic powder may be measured by using, for example, a laser diffraction particle size distribution analyzer. Particle size D50 at 50% of the cumulative volume, particle size D10 at 10% of the cumulative volume, and particle size D90 at 90% of the cumulative volume are also measured by using the same apparatus.

Particle size D10 at 10% of the cumulative volume of the magnetic powder, D10 corresponding to the particle size at which the cumulative volume is 10%, may be 3 μm or less and is preferably 2.5 μm or less, and more preferably 2 μm or less. Within the above range, particle size D10 at 10% of the cumulative volume may be 0.5 μm or more and is preferably 0.1 μm or more.

Particle size D90 at 90% of the cumulative volume of the magnetic powder, D90 corresponding to the particle size at which the cumulative volume is 90%, may be 10 μm or less and is preferably 8 μm or less and more preferably 7 μm or less. Within the above range, particle size D90 at 90% of the cumulative volume may be 2 μm or more.

Furthermore, D90/D10 of the magnetic powder, the ratio of particle size D90 at 90% of the cumulative volume to particle size D10 at 10% of the cumulative volume, may be 19 or lower and is preferably 10 or lower and more preferably 7 or lower. Within the above range, D90/D10 may be 1 or higher and is preferably 2 or higher. When D90/D10 is 1 or higher and 19 or lower, the desired inductance can be readily achieved.

Furthermore, D10/D50 of the magnetic powder, the ratio of particle size D10 at 10% of the cumulative volume to particle size D50 at 50% of the cumulative volume, may be 0.1 or higher and is preferably 0.3 or higher, more preferably 0.4 or higher, and still more preferably 0.5 or higher. Within the above range, D10/D50 may be 0.9 or lower. When D10/D50 is 0.1 or higher and 0.9 or lower, the desired inductance can be readily achieved.

D90/D50 of the magnetic powder, the ratio of the particle size D90 at 90% of the cumulative volume to the particle size D50 at 50% of the cumulative volume, may be 3 or lower and is preferably 2.5 or lower and more preferably 2 or lower. Within the above range, D90/D50 may be 1 or higher. When D90/D50 is 1 or higher and 2 or lower, the desired inductance can be readily achieved.

The magnetic powder has a Vickers hardness of, for example, 1000 (kgf/$mm^2$) or lower, preferably 600 (kgf/$mm^2$) or lower, and more preferably 500 (kgf/$mm^2$) or lower. Within the above range, the Vickers hardness may be 100 (kgf/$mm^2$) or higher. When the Vickers hardness is 100 (kgf/$mm^2$) or higher and 1000 (kgf/$mm^2$) or lower, the desired inductance can be readily achieved. The Vickers hardness of the magnetic powder can be measured with a commercially available measuring device, such as a nano-indentation tester ENT-2100 (manufactured by ELIONIX INC.) in accordance with the instruction manual of the device.

In the magnetic portion included in an element body, the packing density of the magnetic powder by volume may be 60% or higher and is preferably 65% or higher and more preferably 70% or higher. Within the above range, the packing density of the magnetic powder by volume may be 95% or lower. The packing density of the magnetic powder in the magnetic portion is obtained by observing a cross section of the magnetic portion with a scanning electron microscope (SEM) and calculating the ratio of the area of the magnetic powder to the area of the observation field (e.g., a rectangular observation field at 1000× magnification). The area of the magnetic powder in the observation field can be calculated in accordance with the contrast of a SEM image. The position where the packing density of the magnetic powder is calculated may be any position in the magnetic portion and may be a position at 30% of the height of the element body from the top surface opposing the mounting surface to the mounting surface. A cross section observed with SEM may be substantially parallel to the mounting surface.

The magnetic portion included in the element body may be formed of a composite material containing a magnetic powder and a binder, such as a resin. Examples of the magnetic powder include iron-based magnetic metal powders, such as Fe-based, Fe—Si-based, Fe—Ni-based, Fe—Si—Cr-based, Fe—Si—Al-based, Fe—Ni—Al-based, Fe—Ni—Mo-based, and Fe—Cr—Al-based magnetic metal powders, magnetic metal powders having other compositions, amorphous magnetic metal powders, magnetic metal powders having surfaces covered with an insulator, such as glass, magnetic metal powders having modified surfaces, and nanoscale fine magnetic metal powders.

The magnetic powder is preferably a magnetic metal powder containing iron (Fe) and silicon (Si) and more preferably a magnetic metal powder containing iron (Fe), silicon (Si), and chromium (Cr). When the magnetic powder is a magnetic metal powder containing iron (Fe), silicon (Si), and chromium (Cr), the magnetic metal powder may contain 1 mass % or higher of silicon and preferably contains 3 mass % or higher. Within the above range, the magnetic metal powder may contain 7 mass % or lower of silicon. When the magnetic powder is a magnetic metal powder containing iron (Fe), silicon (Si), and chromium (Cr), the magnetic metal powder may contain 1 mass % or higher of chromium and preferably contains 3 mass % or higher. Within the above range, the magnetic metal powder may contain 7 mass % or lower of chromium. When the magnetic powder is a magnetic metal powder containing iron (Fe), silicon (Si), and chromium (Cr), the magnetic metal powder may contain 80 mass % or higher of iron and preferably contains 90 mass % or higher and 98 mass % or lower (i.e., from 90 mass % to 98 mass %). When the magnetic powder is a magnetic metal powder containing iron and silicon, the magnetic crystalline anisotropy constant decreases. When the uniformity and isotropy of the magnetic domains can be maintained, coercivity decreases and magnetic permeability increases. In addition, when a magnetic metal powder further contains chromium (Cr) in addition to iron and silicon, a passivated film can be formed on the surface of the magnetic metal powder. Thus, the magnetic metal powder is unlikely to rust. Furthermore, having further the predetermined feature, the magnetic powder can more readily obtain desired characteristics.

The magnetic powder may contain a crystalline soft magnetic material or an amorphous soft magnetic material. The magnetic powder may have an insulating layer on the surface thereof. The insulating layer may contain a material derived from a constituent of the magnetic powder or a constituent different from that in a material contained in the magnetic powder. When the magnetic powder has an insulating layer, the material of the insulating layer may be an inorganic material. The insulating layer may have a thickness of 200 nm or less and preferably has a thickness of 100 nm or less or 50 nm or less. The insulating layer may have a thickness of 10 nm or more. When the thickness of the insulating layer is within the predetermined range, insulation resistance and withstand voltage tend to further improve.

Examples of the resin, which is an exemplary binder contained in the magnetic portion, include thermosetting resins, such as epoxy resins, polyimide resins, and phenol resins, and thermoplastic resins, such as polyethylene resins, polyamide resins, and liquid crystal polymers. The magnetic portion may contain 0.5 mass % or higher of resin and preferably contains 1 mass % or higher and more preferably 2 mass % or higher. Within the above range, the magnetic portion may contain 5 mass % or lower of resin and preferably contains 4 mass % or lower and more preferably 3 mass % or lower.

The element body may have a magnetic permeability (μ') of 10 or higher at 10 MHz and preferably has a magnetic permeability of 20 or higher and more preferably 25 or higher. When the magnetic permeability of the element body is higher than or equal to the predetermined value, a high inductance can be obtained. The magnetic permeability of the element body can be calculated by using EDA software.

The inductor according to the first aspect has excellent high-frequency characteristics and sufficiently copes with higher current. Thus, such an inductor can be suitably used for DC-DC converters. The frequency used may be 3 MHz or higher and is preferably 6 MHz or higher and more preferably 10 MHz or higher. The inductor according to the first aspect includes an element body having high insulation resistance and excellent withstand voltage. The inductor may have an insulation resistance of 1 kΩ/mm or higher. The withstand voltage may be 20 V/mm or higher. The insulation resistance can be measured with a commercially available measuring device, such as SM-8213 (manufactured by DKK-TOA CORPORATION) in accordance with the instruction manual of the device. The withstand voltage can be measured with a commercially available measuring device, such as TOS9201 (manufactured by KIKUSUI ELECTRONICS CORPORATION) in accordance with the instruction manual of the device.

The inductor may be produced by the following method. A method for producing an inductor includes a first step of embedding a coil in a magnetic material that contains a magnetic powder and 5 mass % or lower of a resin, the magnetic powder having a particle size D50 at 50% of the cumulative volume of 5 μm or lower, a D90/D10 of 19 or lower, and a Vickers hardness of 1000 (kgf/mm$^2$) or lower, the D90/D10 being the ratio of particle size D90 at 90% of the cumulative volume to particle size D10 at 10% of the cumulative volume in the cumulative particle size distribution by volume, and a second step of molding, with a pressure of 5 ton/cm$^2$ or more, the magnetic material in which the coil is embedded, to obtain an element body in which the packing density of the magnetic powder is 60% or higher.

A magnetic material containing a magnetic powder having predetermined characteristics is molded with equal to or higher than the predetermined pressure. Thus, an inductor having excellent high-frequency characteristics can be effectively produced. The pressure in the second step is preferably 5 ton/cm$^2$ or higher and more preferably 10 ton/cm$^2$ or higher.

The word "step" in the present specification refers not only to an independent step, but also to a step that is not clearly separable from another step, provided that a predetermined object of the step is achieved. When a composition contains plural types of substances corresponding to a constituent of the composition, the amount of constituent in the composition refers to the total amount of plural types of the substances in the composition, unless stated otherwise. Hereinafter, embodiments of the present disclosure will be described with reference to the drawings. The following embodiments describe an inductor and a method for producing an inductor to realize the technical idea of the present disclosure. The present disclosure is not limited to the inductor and the method for producing an inductor, which will be described hereinafter. Members described in Claims are not limited to the members in the embodiments. In particular, the features, such as the size, material, shape, and relative arrangement, of components in the embodiments are not intended to limit the scope of the present disclosure unless stated otherwise and are merely examples. The size and positional relationship of the members illustrated in the drawings may be graphically exaggerated for clarity. Furthermore, in the following description, the same members or members having the same quality have the same name or symbol, and a detailed description thereof is optionally omitted. It should also be added that regarding each component constituting the present disclosure, one member may constitute plural components and function as the plural components, or conversely, plural members may function as one component. The description in one example may be used in another example.

EXAMPLES

Hereinafter, the present disclosure will be more specifically described with reference to Examples. The present disclosure is not limited to such Examples. In the following examples, measurement values were obtained by the following methods.

Particle Size Distribution and Vickers Hardness

Particle size D10 at 10% of the cumulative volume of the magnetic powder, particle size D50 at 50% of the cumulative volume, and particle size D90 at 90% of the cumulative volume were measured with a laser diffraction particle size distribution analyzer Microtrac MT3000-II (manufactured by MicrotracBEL Corp.). The Vickers hardness of the magnetic powder was measured with a nano-indentation tester ENT-2100 (manufactured by ELIONIX INC.).

Packing Density of Magnetic Powder

A cross-section sample was produced at 30% of the height T of an inductor from the top surface to the mounting surface. A SEM image of the sample was obtained by using a scanning electron microscope (SEM; 1000×). The obtained SEM image was processed by image analysis software to calculate the packing density of the magnetic powder in the element body.

Electromagnetic Characteristics

The inductance, the Q factor, and the resistance of the inductor were measured by using a network analyzer E5071C (manufactured by Agilent Technologies, Inc.). The magnetic permeability of the inductor was measured by using a material analyzer E4991 (manufactured by Agilent Technologies, Inc.).

Example 1

Figure 2:
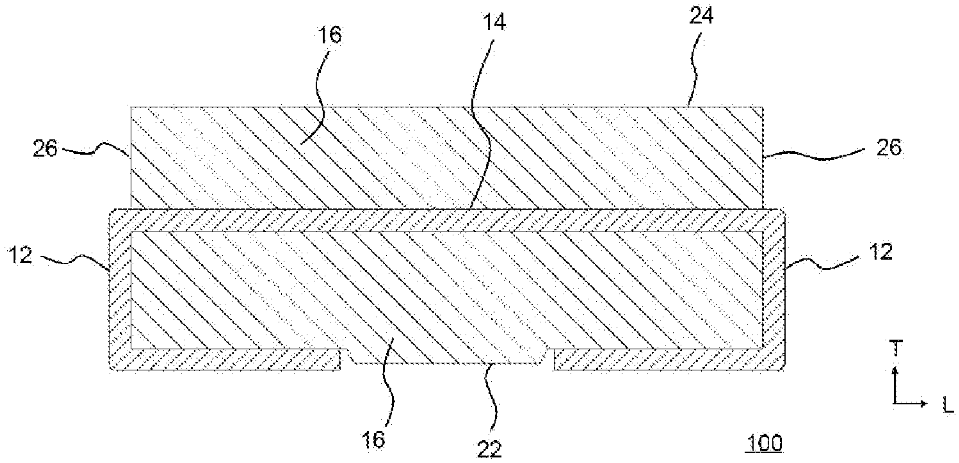
FIG. 2 is a cross-sectional view taken along line A-A of FIG. 1.

An inductor 100 in Example 1 will be described with reference to FIG. 1 and FIG. 2. FIG. 1 is a schematic perspective view of the inductor 100 in Example 1. FIG. 2 is a schematic cross-sectional view taken along line AA of FIG. 1 that denotes a plane perpendicular to the mounting surface.

As illustrated in FIG. 1 and FIG. 2, the inductor 100 in Example 1 includes an element body 10 and an external terminal 12. The element body 10 includes a magnetic portion 16 containing a magnetic powder and a coil 14 embedded in the magnetic portion 16. The external terminal 12 is formed so as to extend from the coil 14 embedded in the element body 10 and disposed on the surface of the element body.

The element body 10 has two main surfaces 22 and 24 opposing each other, end surfaces 26 opposing each other, the end surfaces 26 being next to the respective main surfaces, and side surfaces 28 opposing each other, the side surfaces 28 being next to the respective main and end surfaces. One of the two main surfaces is the mounting surface 22 and the other is the top surface 24. The element body 10 is defined by the height T, which is the dimension between the mounting surface 22 and the top surface 24, the length L, which is the dimension between the end surfaces 26, and the width W, which is the dimension between the side surfaces 28.

The coil 14 is formed of a straight metal sheet and disposed so as to go through the magnetic portion 16 in a direction in which the side surfaces oppose each other. The metal sheet extends, and the external terminal 12 is formed on each end of the coil 14. The external terminals 12 extend from the respective side surfaces 28 of the element body 10. Each external terminal 12 having two bending portions is disposed along the side surface 28 of the element body 10 and extends to the mounting surface 22 of the element body 10. The coil 14 and the external terminal 12 are formed of a conductive metal, such as copper. The external terminal 12 is disposed so as to be in contact with the side surface 28 and the mounting surface 22 of the element body 10. The mounting surface 22 of the element body 10 has a recess in which a portion of the external terminal 12 is accommodated.

The magnetic portion 16 included in the element body 10 is formed of a composite material containing a magnetic powder and a binder, such as a resin. The magnetic powder was a crystalline Fe—Si—Cr-based magnetic metal powder containing 3 mass % of silicon, 5 mass % of chromium, and iron as the balance. Regarding the magnetic powder, particle size D10 at 10% of the cumulative volume was 1.43 μm, particle size D50 at 50% of the cumulative volume was 2.90 μm, particle size D90 at 90% of the cumulative volume was 5.45 μm, and Vickers hardness was 400±50. In a composite material that contained 2.5 mass % of an epoxy resin as the resin in addition to the magnetic powder, a coil that was a straight metal sheet was embedded, and a pressure of 10 ton/cm$^2$ was applied to form an element body to obtain the inductor 100 in Example 1.

Figure 3:
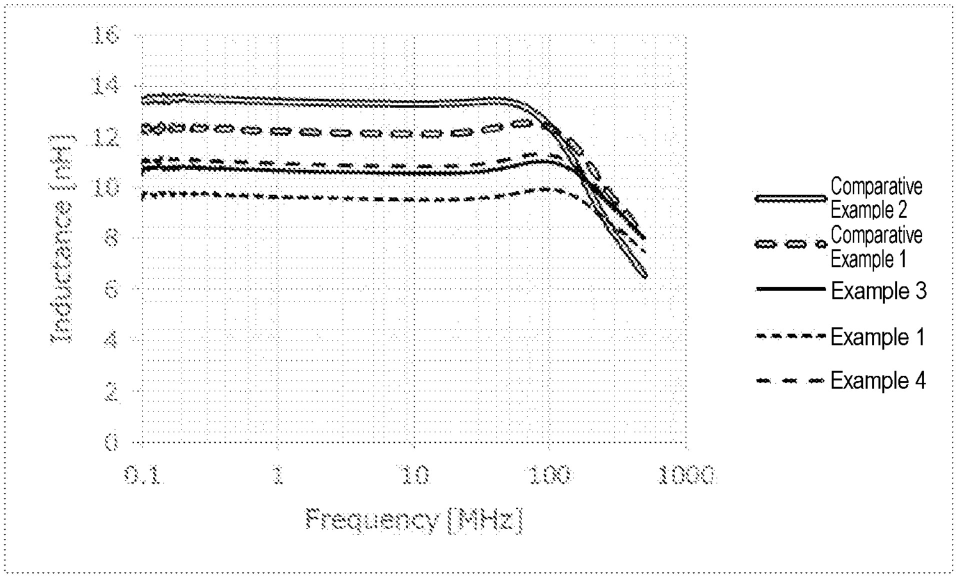
FIG. 3 is a graph of the relationship between the frequency and the inductance of an inductor.
Figure 4:
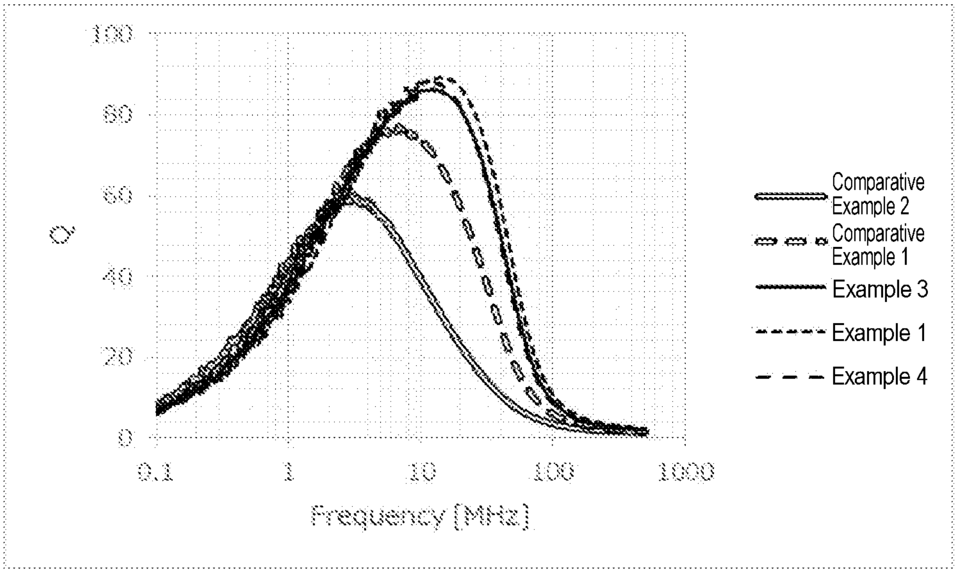
FIG. 4 is a graph of the relationship between the frequency and the Q factor of an inductor.
Figure 5:
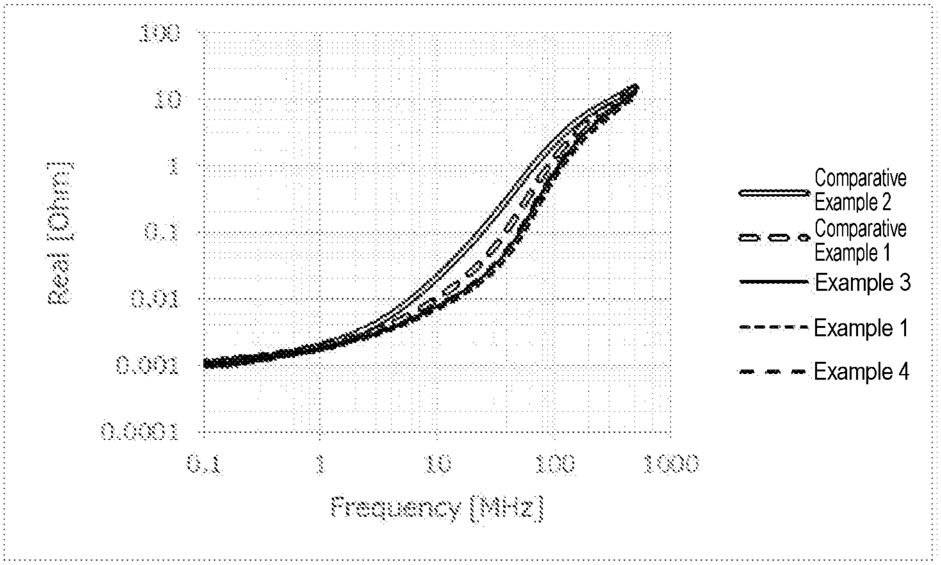
FIG. 5 is a graph of the relationship between the frequency and the resistance of an inductor.

Regarding the obtained inductor, FIG. 3 shows the relationship of the operating frequency and the inductance, FIG. 4 shows the relationship of the operating frequency and the Q factor, FIG. 5 shows the relationship of the operating frequency and the resistance. The inductance of the inductor at 10 MHz was 9.53 nH, and the Q factor of the inductor was 87.25.

Example 2

An inductor in Example 2 was obtained in the same manner as in Example 1, except that the magnetic powder was a magnetic metal powder having a particle size D10 at 10% of the cumulative volume of 2.05 μm, a particle size D50 at 50% of the cumulative volume of 3.21 μm, and a particle size D90 at 90% of the cumulative volume of 5.05 μm.

Regarding the obtained inductor, FIG. 3 shows the relationship of the operating frequency and the inductance, FIG. 4 shows the relationship of the operating frequency and the Q factor, and FIG. 5 shows the relationship of the operating frequency and the resistance. The inductance of the inductor at 10 MHz was 9.85 nH, and the Q factor of the inductor was 81.80.

Example 3

An inductor in Example 3 was obtained in the same manner as in Example 1, except that the magnetic powder was a magnetic metal powder having a particle size D10 at 10% of the cumulative volume of 1.77 μm, a particle size D50 at 50% of the cumulative volume of 3.32 μm, and a particle size D90 at 90% of the cumulative volume of 6.13 μm.

Regarding the obtained inductor, FIG. 3 shows the relationship of the operating frequency and the inductance, FIG. 4 shows the relationship of the operating frequency and the Q factor, and FIG. 5 shows the relationship of the operating frequency and the resistance. The inductance of the inductor at 10 MHz was 10.55 nH, and the Q factor of the inductor was 85.71.

Example 4

An inductor in Example 4 was obtained in the same manner as in Example 1, except that the magnetic powder was a magnetic metal powder having a particle size D10 at 10% of the cumulative volume of 1.97 μm, a particle size D50 at 50% of the cumulative volume of 3.53 μm, and a particle size D90 at 90% of the cumulative volume of 6.45 μm.

Regarding the obtained inductor, FIG. 3 shows the relationship of the operating frequency and the inductance, FIG. 4 shows the relationship of the operating frequency and the Q factor, and FIG. 5 shows the relationship of the operating frequency and the resistance. The inductance of the inductor at 10 MHz was 10.82 nH, and the Q factor of the inductor was 87.79.

Comparative Example 1

An inductor in Comparative Example 1 was obtained in the same manner as in Example 1, except that the magnetic powder was a magnetic metal powder having a particle size D10 at 10% of the cumulative volume of 3.06 μm, a particle size D50 at 50% of the cumulative volume of 6.28 μm, and a particle size D90 at 90% of the cumulative volume of 11.83 μm.

Regarding the obtained inductor, FIG. 3 shows the relationship of the operating frequency and the inductance, FIG. 4 shows the relationship of the operating frequency and the Q factor, and FIG. 5 shows the relationship of the operating frequency and the resistance. The inductance of the inductor at 10 MHz was 12.11 nH, and the Q factor of the inductor was 73.80.

Comparative Example 2

An inductor in Comparative Example 2 was obtained in the same manner as in Example 1, except that the magnetic powder was a magnetic metal powder having a particle size D10 at 10% of the cumulative volume of 3.87 μm, a particle size D50 at 50% of the cumulative volume of 9.71 μm, and a particle size D90 at 90% of the cumulative volume of 23.33 μm.

Regarding the obtained inductor, FIG. 3 shows the relationship of the operating frequency and the inductance, FIG. 4 shows the relationship of the operating frequency and the Q factor, and FIG. 5 shows the relationship of the operating frequency and the resistance. The inductance of the inductor at 10 MHz was 13.28 nH, and the Q factor of the inductor was 39.60.

Comparative Example 3

An inductor in Comparative Example 3 was obtained in the same manner as in Example 1, except that the magnetic powder was an amorphous Fe—Si—Cr-based magnetic metal powder. Such a magnetic metal powder contained 6.7 mass % of silicon, 2.5 mass % of chromium, 2.5 mass % of boron, and iron as the balance and had a particle size D10 at 10% of the cumulative volume of 2.67 μm, a particle size D50 at 50% of the cumulative volume of 4.28 μm, a particle size D90 at 90% of the cumulative volume of 5.95 μm, and a Vickers hardness of 1000±100.

Regarding the obtained inductor, FIG. 3 shows the relationship of the operating frequency and the inductance, FIG. 4 shows the relationship of the operating frequency and the Q factor, and FIG. 5 shows the relationship of the operating frequency and the resistance. The inductance of the inductor at 10 MHz was 4.10 nH, and the Q factor of the inductor was 50.00.

TABLE 1

| | Magnetic powder | Vickers hardness | D10 (μm) | D50 (μm) | D90 (μm) | D90/ D10 | D10/ D50 | D90/ D50 | at 10 MHz L (nH) | at 10 MHz Q |
|---|---|---|---|---|---|---|---|---|---|---|
| Example 1 | Fe—Si—Cr '(crystalline) Se: 3 wt %, Cr: 5 wt %, Fe: balwt % | 400 ± 50 | 1.43 | 2.90 | 5.45 | 3.81 | 0.49 | 1.88 | 9.53 | 87.25 |
| Example 2 | Fe—Si—Cr '(crystalline) Se: 3 wt %, Cr: 5 wt %, Fe: balwt % | 400 ± 50 | 2.05 | 3.21 | 5.05 | 2.46 | 0.64 | 1.57 | 9.85 | 81.80 |
| Example 3 | Fe—Si—Cr '(crystalline) Se: 3 wt %, Cr: 5 wt %, Fe: balwt % | 400 ± 50 | 1.77 | 3.32 | 6.13 | 3.46 | 0.53 | 1.85 | 10.55 | 85.71 |
| Example 4 | Fe—Si—Cr '(crystalline) Se: 3 wt %, Cr: 5 wt %, Fe: balwt % | 400 ± 50 | 1.97 | 3.53 | 6.45 | 3.27 | 0.56 | 1.83 | 10.82 | 87.79 |
| Comparative Example 1 | Fe—Si—Cr '(crystalline) Se: 3 wt %, Cr: 5 wt %, Fe: balwt % | 400 ± 50 | 3.06 | 6.28 | 11.83 | 3.87 | 0.49 | 1.88 | 12.11 | 73.80 |
| Comparative Example 2 | Fe—Si—Cr '(crystalline) Se: 3 wt %, Cr: 5 wt %, Fe: balwt % | 400 ± 50 | 3.87 | 9.71 | 23.33 | 6.04 | 0.40 | 2.40 | 13.28 | 39.60 |
| Comparative Example 3 | Fe—Si—Cr (amorphous) Se: 6.7 wt %, Cr: 2.5 wt %, B: 2.5 wt % Fe: balwt % | 1000 ± 100 | 2.67 | 4.28 | 5.95 | 2.23 | 0.62 | 1.39 | 4.10 | 50.00 |

Each inductor in Examples 1 to 4 has an inductance of about 10 nH at 10 MHz and an excellent Quality factor of 80 or higher. The frequency of the inductors in Examples 1, 3, and 4 at the highest Quality factor was about 3 to 10 MHz higher than that of Comparative examples 1 and 2. Furthermore, when the magnetic powder has an average particle size of 5 μm or less, L value was maintained to about 10 nH, thereby decreasing the resistance. Therefore, the inductors in Examples contribute to improvement in characteristics of circuits, such as DC-DC converter circuits having higher operating frequency and coping with higher current.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor comprising:

an external terminal; and an element body that includes a magnetic portion containing a magnetic powder and a coil embedded in the magnetic portion, wherein the magnetic powder has a Vickers hardness of 1000 $kgf/mm^2$ or less, a particle size D50 being 3.53

μm or less at 50% of a cumulative volume in a cumulative particle size distribution on a basis of volume, and a D90/D10 of 19 or less, the D90/D10 being a ratio of a particle size D90 at 90% of a cumulative volume to a particle size D10 at 10% of a cumulative volume, and in the magnetic portion, a packing density of the magnetic powder on a basis of volume is 60% or greater.

2. The inductor according to claim 1, wherein the element body has a magnetic permeability of 10 or higher at 10 MHz.

3. The inductor according to claim 2, wherein the magnetic powder is a magnetic metal powder containing iron and silicon.

4. The inductor according to claim 2, wherein the magnetic powder contains a crystalline soft magnetic material.

5. The inductor according to claim 2, wherein the magnetic powder has an insulating layer on a surface of the magnetic powder.

6. The inductor according to claim 2, wherein the element body has two main surfaces opposing each other, end surfaces opposing each other which are adjacent to the respective main surfaces, and side surfaces opposing each other which are adjacent to the respective main surfaces and the end surfaces, with one of the main surfaces being a mounting surface, and the coil is a straight metal sheet.

7. The inductor according to claim 1, wherein the magnetic powder is a magnetic metal powder containing iron and silicon.

8. The inductor according to claim 7, wherein the magnetic powder contains silicon of from 1 mass % to 7 mass %, and iron of 80 mass % or greater.

9. The inductor according to claim 8, wherein the magnetic powder contains a crystalline soft magnetic material.

10. The inductor according to claim 8, wherein the magnetic powder has an insulating layer on a surface of the magnetic powder.

11. The inductor according to claim 8, wherein the element body has two main surfaces opposing each other, end surfaces opposing each other which are adjacent to the respective main surfaces, and side surfaces opposing each other which are adjacent to the respective main surfaces and the end surfaces, with one of the main surfaces being a mounting surface, and the coil is a straight metal sheet.

12. The inductor according to claim 7, wherein the magnetic powder contains a crystalline soft magnetic material.

13. The inductor according to claim 7, wherein the magnetic powder has an insulating layer on a surface of the magnetic powder.

14. The inductor according to claim 7, wherein the element body has two main surfaces opposing each other, end surfaces opposing each other which are adjacent to the respective main surfaces, and side surfaces opposing each other which are adjacent to the respective main surfaces and the end surfaces, with one of the main surfaces being a mounting surface, and the coil is a straight metal sheet.

15. The inductor according to claim 1, wherein the magnetic powder contains a crystalline soft magnetic material.

16. The inductor according to claim 1, wherein the magnetic powder has an insulating layer on a surface of the magnetic powder.

17. The inductor according to claim 16, wherein the insulating layer of the magnetic powder has a thickness of 200 nm or less.

18. The inductor according to claim 1, wherein the element body has two main surfaces opposing each other, end surfaces opposing each other which are adjacent to the respective main surfaces, and side surfaces opposing each other which are adjacent to the respective main surfaces and the end surfaces, with one of the main surfaces being a mounting surface, and the coil is a straight metal sheet.

19. The inductor according to claim 18, wherein the packing density is measured at 30% of a height of the element body from the main surface, which opposes to the mounting surface, to the mounting surface.

* * * * *